Filed Jan. 14, 1947

Inventor
John J. McLaughlin
By Harry Langsam
Attorney

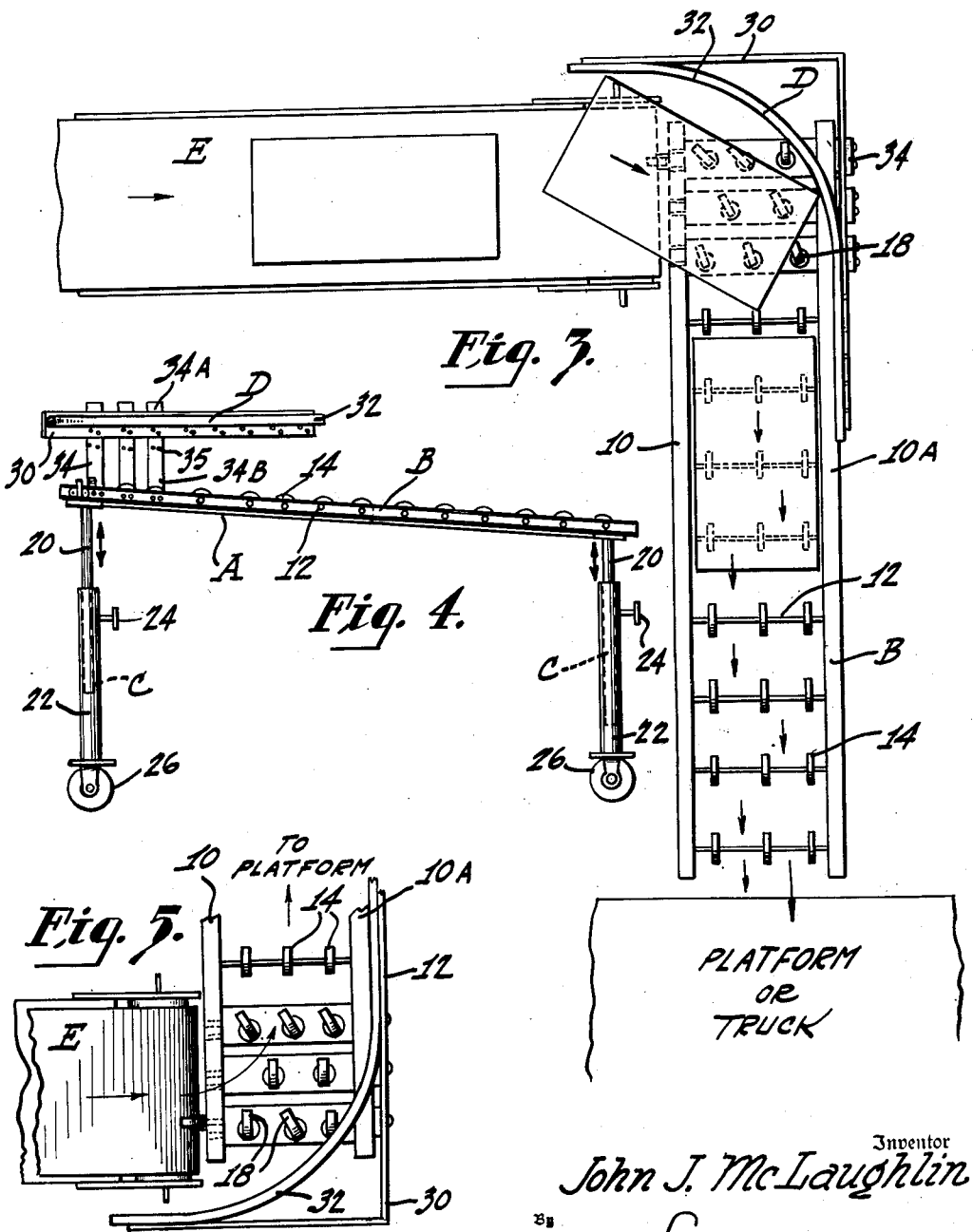

Oct. 14, 1952   J. J. McLAUGHLIN   2,613,789
GRAVITY CONVEYER SECTION
Filed Jan. 14, 1947   3 Sheets-Sheet 3
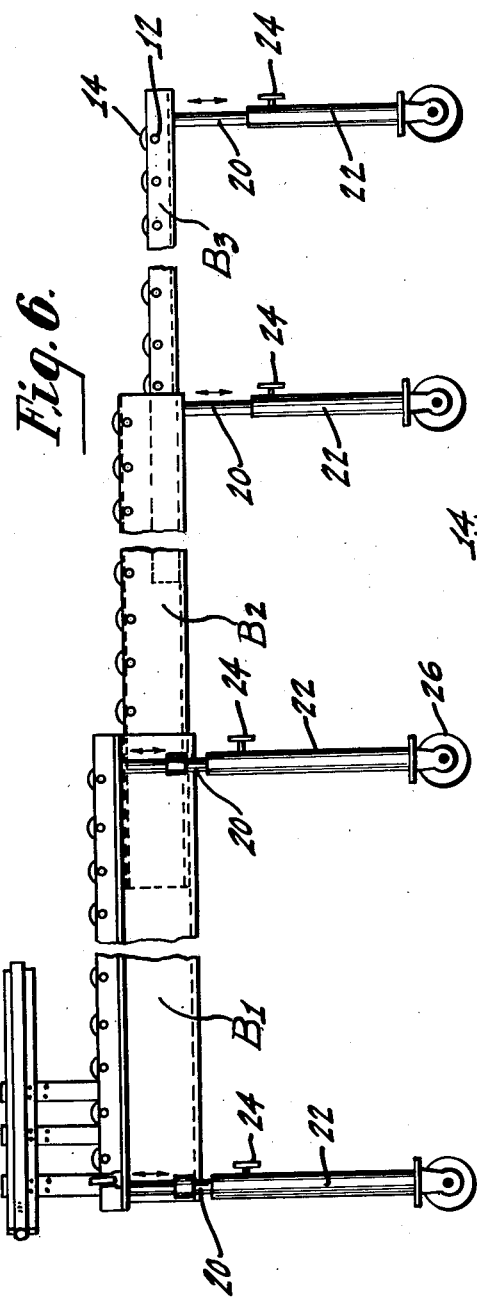
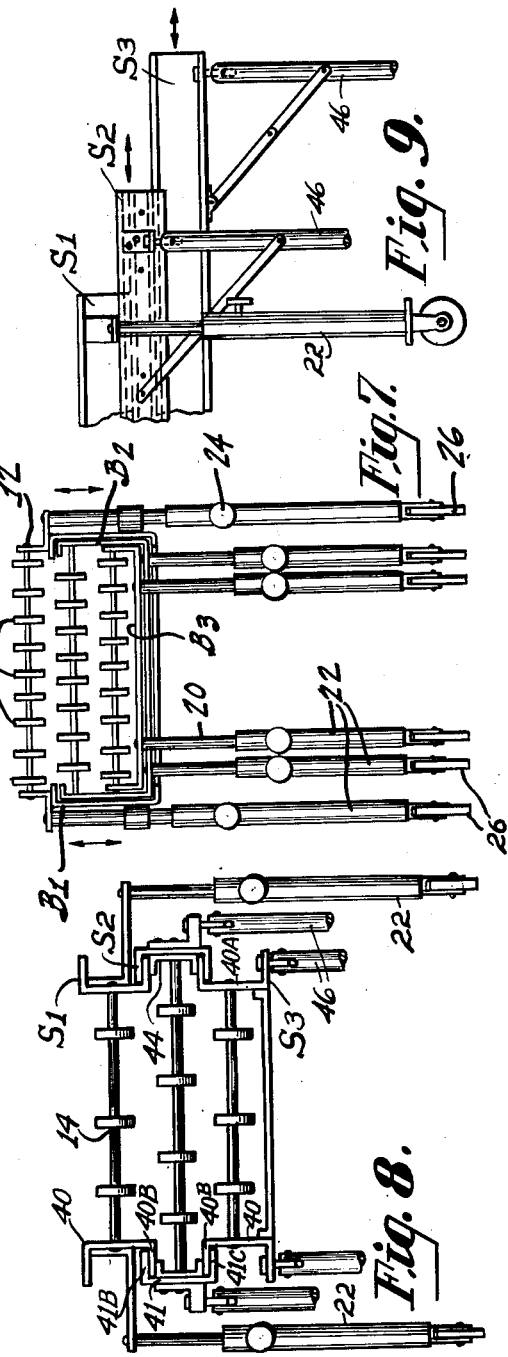
John J. McLaughlin
By Harry Sangsam
Attorney Patented Oct. 14, 1952

2,613,789

UNITED STATES PATENT OFFICE 2,613,789

GRAVITY CONVEYER SECTION

John J. McLaughlin, Philadelphia, Pa., assignor to The Wilkie Company, Philadelphia, Pa.

Application January 14, 1947, Serial No. 721,909

1 Claim. (Cl. 193—35)

My invention relates to conveyor systems and deals particularly with an improved gravity conveyor section.

Gravity conveyor sections have been widely used in factories and in warehouses in conjunction with powered conveyor belts. Their applications include the loading and unloading of trucks and railway cars, the routing of packaged goods to and from storage areas, and the routing of articles within a manufacturing process.

When used in conjunction with powered conveyor belts in the applications cited above, the ordinary gravity conveyor section is deficient in several respects. The section has no provision for transferring goods onto or from the conveyor belt, and it has been necessary to station a man at the juncture of the conveyor section and the conveyor belt for this purpose. The sections, furthermore, are of a fixed length.

An object of my invention is to provide a mobile conveyor section and diverter which can sidetrack goods from any point along the length of a powered conveyor line, and which can also deliver goods to the conveyor line at any point.

Another object of my invention is to provide a mobile and extensible conveyor section, so that its length may be extended to the exact distance that the goods are to be conveyed.

Another object of my invention is to provide a mobile conveyor section and diverter which can divert and convey goods from a powered conveyor line directly to a vehicle or a storage area, or in the opposite direction.

Another object of my invention is to provide a mobile conveyor section and diverter, whereby new conveyor routes may be rapidly improvised within a factory, as when a manufacturing process is being developed or altered.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 3 is a top view of an embodiment of my gravity conveyor section arranged to relay goods from the end of a powered conveyor to a platform or truck.

Fig. 4 is a side elevation view of one embodiment of my invention.

Fig. 5 is a fragmentary top view of the conveyor section of Fig. 3 arranged to relay goods in a direction opposite to that of Fig. 3.

Fig. 6 is a side elevation of an extensible gravity conveyor in extended position.

Fig. 7 is an end view of the extensible gravity conveyor section illustrated in Fig. 6, the section being in its contracted position.

Fig. 8 is an end view of the preferred construction of my extensible conveyor.

Fig. 9 is a fragmentary side view of the extensible conveyor of Fig. 8.

Referring now in greater detail to the drawings wherein similar reference characters refer to similar parts, I show a mobile gravity diverter and conveyor section, generally designated as A.

The section comprises a bed and frame B; the supports C and a diverter D.

Figure 1:
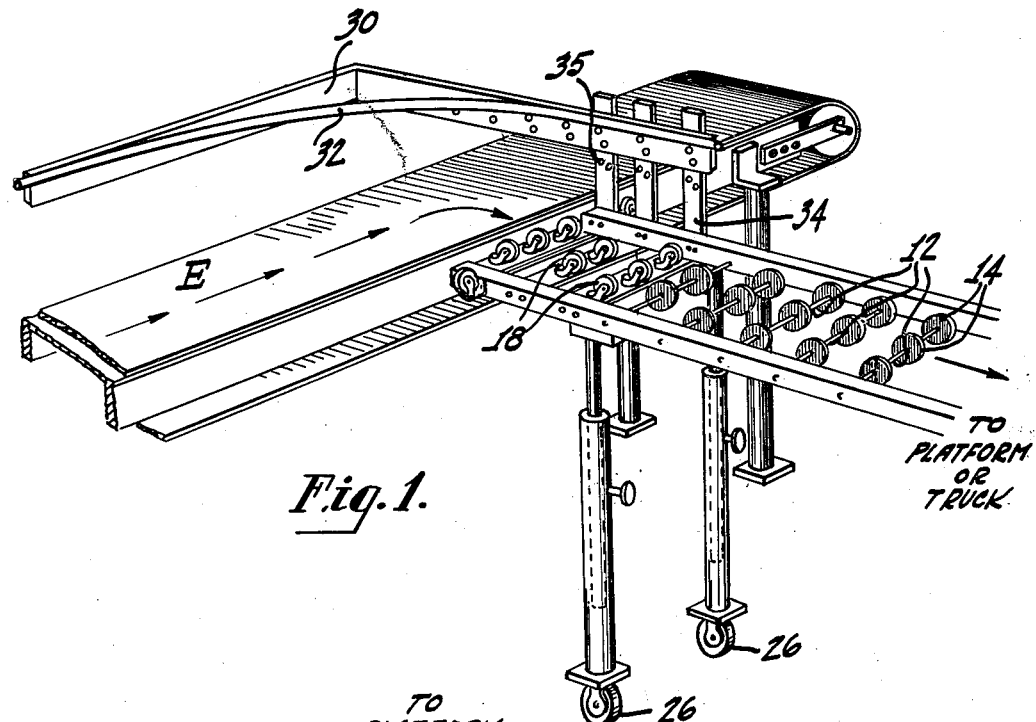
Fig. 1 is a fragmentary perspective view of an embodiment of my invention arranged to divert goods away from a point on a powered conveyor line.

The bed D consists of a pair of parallel frame members 10 and 10A, which are connected by a plurality of longitudinally spaced cross rods 12 having wheels 14 thereon as commonly used to facilitate the passage of packaged goods. At the forward or diverter end of the bed, the cross-rods 12 bear casters 18 to facilitate the change in direction of a packgae which is being diverted onto or off the section. The supports C are telescopic so as to enable the bed to be raised to the desired elevation and degree of inclination. For example, in the application shown in Fig. 1, where the section is used to divert packages from a conveyor belt onto a platform or truck, the diverter end is raised until the tops of the casters 18 are level with the conveyor belt, which is generally designated as E. The other end of the section B is lowered below the level of the diverter end so that the packages will move by gravity to their destination. The telescopic supports C consist of a vertically extending pipe or rod 20, the upper end of which is secured to the frame members 10 and 10A. The lower end slides within another pipe 22, and can be locked at any desired height by the handscrew 24 threaded into the wall of the outer pipe 22.

The lower ends of the supports are provided with wheels 26 making the section easy to move about as desired.

The diverter member D consists of a right angle frame 30 and an arcuate diverter rod 32, the members 30 and 32 being welded together at their ends. A number of uprights 34 are adapted to fasten to either side of the section at one end 34B and are adapted to clamp the diverter at the other end 34A, by means of quick-detachable bolts. Additional braces (not shown) may be used to strengthen the support of the diverter member D.

A number of holes 35 are provided in the uprights so that the diverter may be supported at various heights above the bed depending on the size of the packages which are being conveyed.

Figure 2:
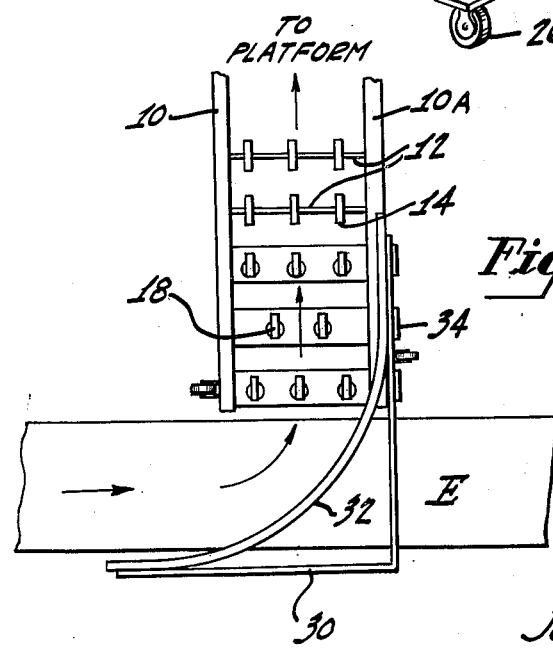
Fig. 2 is a fragmentary top view of an embodiment of my invention wherein the diverter is arranged to sidetrack materials coming from a direction opposite to that of Fig. 1.

In order to adapt the diverter for a conveyor belt traveling in an opposite direction, shown in Fig. 2, the uprights are transferred to the other side of the section and the diverter is bolted to the opposite side of the uprights.

Since either end of the section can be elevated, it is apparent that the section can be used to deliver goods to the powered conveyor belt, as well as to remove goods from the belt.

In a modification of my invention, shown in Figs. 6 and 7, the bed is made extensible, so that its length may be increased several times. This enables my conveyor section to be extended to the exact distance between say, a conveyor belt and a truck bed, and reduces manual labor to a minimum.

In the modification, B1 is the main bed along which a pair of other beds is slidable. Also, in the pair, B3 is slidable along the other bed, B2. To increase the length of the conveyor section, the pair B2 and B3 is extended, to further increase the length, section B3 is extended from B2. The sections B2 and B3 possess leg supports only at their forward ends, the other ends being already contained and supported. Stops are provided at these other ends to prevent the sections from becoming separated. The extensible gravity section may be used with or without the deflector as desired, it being a simple matter to assemble or remove the deflector.

A preferred construction of my extensible conveyor is illustrated in Figs. 8 and 9. Here all of the sections are of approximately the same width.

The side channel members 40 of the alternate sections S1 and S3 have their open sides 40A on the exterior, forming outwardly-extending ledges 40B.

The intermediate section S2 is made with its side channels 41 reversed, so as to provide inwardly-extending ledges 41B and 41C. The ledges 41B of section S2 overlie the ledge 40B of the top section, so that in effect the section S2 hangs from the top section. Similarly, the ledges 40B of the lowest section S3 overlie the ledges 41C of the middle section S2, so that the lowest section depends from the middle section.

An additional channel member 44 is attached to the insides of the intermediate section channels 41 and serves to prevent the conveyor sections from separating accidentally.

The deflector end of the top section S1 is provided with legs 22 similar to those of Fig. 6.

The free ends of the lower sections S2 and S3 have telescopic hinged legs 46 which fold along the sides of the sections when not in use.

Although I have shown a conveyor consisting only of three sections, it is obvious that the conveyor can be made with additional sections in the same manner.

Although my invention has been described in considerable detail, such description is intended as being illustrative rather than limiting, since the invention may be variously embodied, and the scope of the invention is to be determined as claimed.

I claim as my invention:

In an extensible gravity conveyor, a plurality of telescopic conveyor sections, one being the main conveyor and the other a telescopic section, each section comprising side frame channel members, rotatable wheels carried by cross-members between said channel members, said channel members of one section being oppositely disposed and interfitting with the channel section of its adjacent section whereby the sections may be telescoped to any desired length, a flange of one side section lying upon the flange of said other section, the upper flange of the lowermost section being above and in engagement with the lowermost flange of the upper section, and the lowermost section being solely supported by said flange of the upper section both when collapsed and when in open position, ground elevating means at each end of the main conveyor section, and ground elevating means at only one end of said telescopic conveyor section.

JOHN J. McLAUGHLIN.

REFERENCES CITED

The following references are of record in the file of this patent:

UNITED STATES PATENTS

| Number | Name | Date |
|---|---|---|
| 1,045,939 | Brotz | Dec. 3, 1912 |
| 1,778,267 | McArthur | Oct. 14, 1930 |
| 1,935,734 | Twomley | Nov. 21, 1933 |
| 1,949,972 | Murphy | Mar. 6, 1934 |
| 1,959,735 | Phillips | May 22, 1934 |

FOREIGN PATENTS

| Number | Country | Date |
|---|---|---|
| 517,237 | France | Dec. 16, 1920 |